US011778034B2

(12) United States Patent
Badge et al.

(10) Patent No.: US 11,778,034 B2
(45) Date of Patent: Oct. 3, 2023

(54) EMBEDDED COLLABORATION WITH AN APPLICATION EXECUTING ON A USER SYSTEM

(71) Applicant: Avaya Inc., Basking Ridge, NJ (US)

(72) Inventors: Gaurav Badge, Pune (IN); Biswajyoti Pal, Maharashtra (IN); Ramanujan Kashi, Bangalore (IN)

(73) Assignee: Avaya Management L.P., Morristown, NJ (US)

( * ) Notice: Subject to any disclaimer, the term of this patent is extended or adjusted under 35 U.S.C. 154(b) by 1141 days.

(21) Appl. No.: 14/996,851

(22) Filed: Jan. 15, 2016

(65) Prior Publication Data
US 2017/0205979 A1  Jul. 20, 2017

(51) Int. Cl.
*H04L 67/00* (2022.01)
*H04L 67/14* (2022.01)
*G06Q 10/101* (2023.01)
*H04L 67/02* (2022.01)

(52) U.S. Cl.
CPC .......... *H04L 67/14* (2013.01); *G06Q 10/101* (2013.01); *H04L 67/02* (2013.01)

(58) Field of Classification Search
CPC ......... G06F 3/048; H04L 67/14; H04L 67/02; G06Q 10/101
See application file for complete search history.

(56) References Cited

U.S. PATENT DOCUMENTS

| | | | | |
|---|---|---|---|---|
| 5,446,842 A | * | 8/1995 | Schaeffer | G06Q 10/10 709/205 |
| 6,704,873 B1 | * | 3/2004 | Underwood | H04L 63/02 709/223 |
| 6,721,713 B1 | * | 4/2004 | Guheen | G06Q 50/01 705/1.1 |
| 8,244,808 B2 | * | 8/2012 | Jones | G06Q 10/10 709/205 |
| 8,577,989 B2 | * | 11/2013 | Broda | H04L 67/2842 705/7.11 |
| 8,788,950 B2 | * | 7/2014 | Ivashin | G06F 3/038 715/753 |
| 9,535,567 B1 | * | 1/2017 | Bagrinovskiy | G06F 9/452 |
| 10,152,190 B2 | * | 12/2018 | Jones | G06F 3/0481 |
| 2001/0056466 A1 | * | 12/2001 | Thompson | H04N 21/4788 709/204 |
| 2002/0091725 A1 | * | 7/2002 | Skok | G06F 17/24 715/234 |
| 2002/0099944 A1 | * | 7/2002 | Bowlin | G06F 21/6218 713/185 |
| 2003/0058277 A1 | * | 3/2003 | Bowman-Amuah | G06F 17/30607 715/765 |
| 2004/0024890 A1 | * | 2/2004 | Baek | H04L 63/104 709/229 |

(Continued)

*Primary Examiner* — Tadesse Hailu
*Assistant Examiner* — Andrew Chung

(57) ABSTRACT

Embodiments disclosed herein provide systems, methods, and computer readable media for collaborating on the use of an application executing on a user system. In a particular embodiment, a method provides determining a first view presented to a first user of the user system by the application. The method further provides generating first view information that describes the view such that the view can be represented at a remote user system and transferring the first view information to the remote user system.

20 Claims, 10 Drawing Sheets

(56) References Cited

U.S. PATENT DOCUMENTS

| | | | |
|---|---|---|---|
| 2004/0221010 A1* | 11/2004 | Butler | G06F 3/038 709/204 |
| 2007/0226032 A1* | 9/2007 | White | G06Q 10/101 705/300 |
| 2008/0046803 A1* | 2/2008 | Beauchamp | G06F 17/30563 715/212 |
| 2009/0199090 A1* | 8/2009 | Poston | G06F 17/30997 715/255 |
| 2009/0288105 A1* | 11/2009 | Wookey | H04L 69/328 719/328 |
| 2011/0231518 A1* | 9/2011 | Srinivasan | G06F 17/30056 709/219 |
| 2011/0265009 A1* | 10/2011 | Eby | H04L 41/22 715/740 |
| 2012/0005270 A1* | 1/2012 | Harding | G05B 23/0267 709/203 |
| 2012/0226742 A1* | 9/2012 | Momchilov | G06F 3/1454 709/203 |
| 2012/0266079 A1* | 10/2012 | Lee | G06F 16/27 715/744 |
| 2012/0324365 A1* | 12/2012 | Momchilov | G06F 9/54 715/738 |
| 2013/0111355 A1* | 5/2013 | Jennings | H04L 12/1822 715/753 |
| 2013/0132485 A1* | 5/2013 | Thomas | H04L 12/1822 709/205 |
| 2013/0239192 A1* | 9/2013 | Linga | G06F 3/0482 726/7 |
| 2013/0290868 A1* | 10/2013 | Nancke-Krogh | G06F 9/452 715/750 |
| 2013/0328779 A1* | 12/2013 | Butner | G06F 3/0488 345/163 |
| 2014/0002247 A1* | 1/2014 | Harrison | H04L 12/18 340/12.5 |
| 2014/0013234 A1* | 1/2014 | Beveridge | G06F 3/0484 715/740 |
| 2014/0258877 A1* | 9/2014 | Balz | G06F 3/0481 715/740 |
| 2014/0279235 A1* | 9/2014 | Sandholm | G06Q 30/0613 705/26.41 |
| 2015/0039444 A1* | 2/2015 | Hardin | G06Q 30/0273 705/14.69 |
| 2015/0067591 A1* | 3/2015 | Nancke-Krogh | G06F 3/0481 715/804 |
| 2015/0163281 A1* | 6/2015 | Liu | H04L 67/025 715/740 |
| 2015/0180933 A1* | 6/2015 | Spracklen | G06F 17/246 715/740 |
| 2015/0256593 A1* | 9/2015 | Kelani | H04L 67/025 715/740 |
| 2015/0271013 A1* | 9/2015 | Singh | H04L 67/0806 709/220 |
| 2015/0334162 A1* | 11/2015 | Krishnamurthy | G06F 9/452 715/740 |
| 2016/0014216 A1* | 1/2016 | Chawla | H04L 67/08 715/740 |
| 2016/0253455 A1* | 9/2016 | Hasegawa | G16H 30/40 705/2 |
| 2016/0344819 A1* | 11/2016 | Beveridge | H04L 67/142 |
| 2016/0378451 A1* | 12/2016 | Walker | G06F 8/61 717/111 |
| 2017/0038829 A1* | 2/2017 | Lanier | G06F 3/04883 |
| 2017/0041398 A1* | 2/2017 | Kumar | H04L 67/14 |
| 2017/0054987 A1* | 2/2017 | Rangarajan | H04L 67/02 |
| 2017/0123649 A1* | 5/2017 | Clavel | G06F 3/04817 |
| 2017/0201588 A1* | 7/2017 | Schmidt | H04L 63/0876 |

* cited by examiner

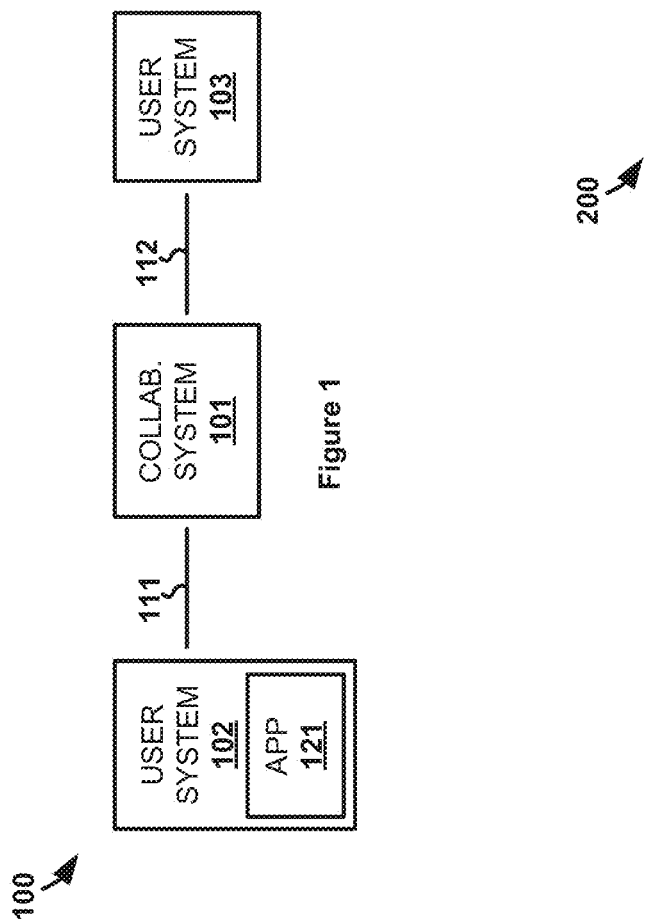
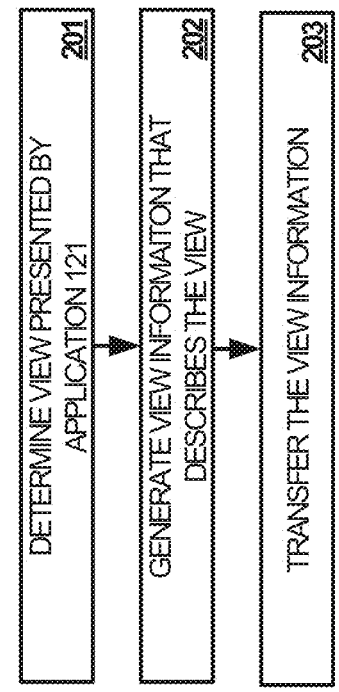

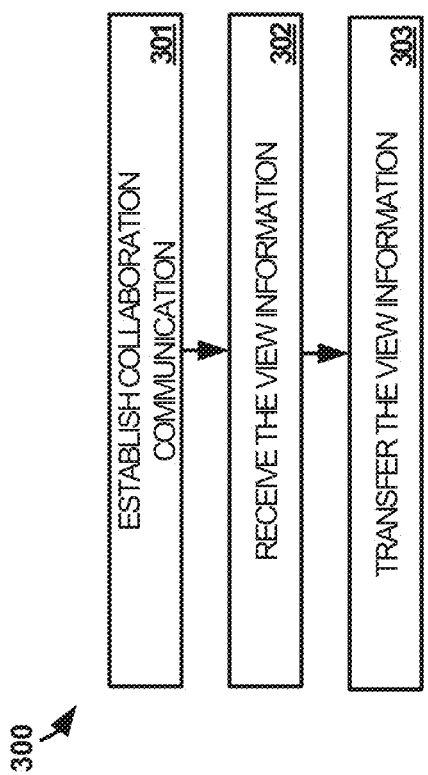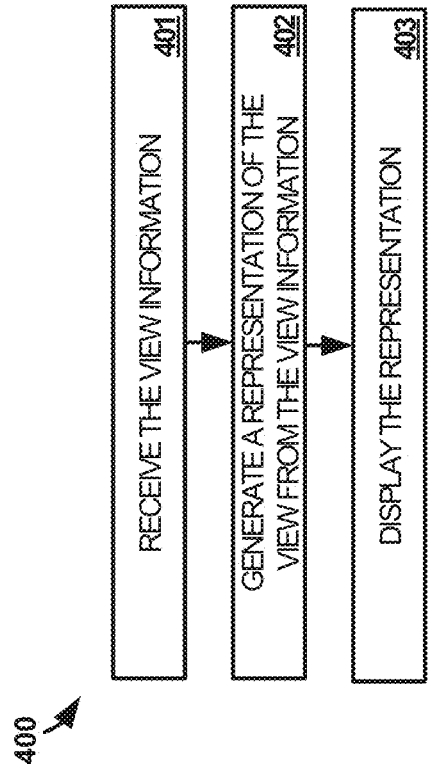

EMBEDDED COLLABORATION WITH AN APPLICATION EXECUTING ON A USER SYSTEM

TECHNICAL FIELD

Aspects of the disclosure are related to collaboration between remote systems and, in particular, to collaborating on the use of an application executing on one of the remote systems.

TECHNICAL BACKGROUND

Modern mobile devices have access to multitudes of applications that are typically downloaded from an application store installed on the devices. Such applications provide many different functionalities including games, shopping apps, messaging apps, productivity apps, and the like. In some cases, a user may require assistance when using an application. To obtain such assistance, that user will likely need to call into a contact center and do their best to describe the issue to an agent. The agent then must try to assist the user based on the user's description, which may not correspond to what is actually happening with the application.

Overview

Embodiments disclosed herein provide systems, methods, and computer readable media for collaborating on the use of an application executing on a user system. In a particular embodiment, a method provides determining a first view presented to a first user of the user system by the application. The method further provides generating first view information that describes the view such that the view can be represented at a remote user system and transferring the first view information to the remote user system.

In some embodiments, the method provides establishing a collaboration communication with the remote user system.

In some embodiments, the first view information comprises a screenshot of the application as currently displayed on the user system.

In some embodiments, the first view information comprises text based metadata.

In some embodiments, the remote user system displays a representation of the first view to a second user of the remote user system. In those embodiments the method further provides receiving input information representing first user input corresponding to user input elements included in the first view from the remote user system and applying the first user input to the application based on the input information.

In some embodiments, the method further provides, after transferring the first view information, determining a second view presented to a first user of the user system by the application, generating second view information that describes the second view such that the second view can be represented at a remote user system, and transferring the second view information to the remote user system.

In some embodiments, determining the first view, generating the first view information, and transferring the first view information are performed at the instruction of a software development kit (SDK) executing on the user system along with the application.

In another embodiment, a method provides receiving first view information from the user system. The first view information describes a first view presented to a first user of the user system such that the view can be represented at the remote user system. The method further provides generating a representation of the first view using the first view information and displaying the representation of the first view to a second user of the remote user system.

In some embodiments, generating the representation of the first view comprises rendering an image of a screenshot of the application as currently displayed on the user system, wherein the first view information includes the screenshot.

In some embodiments, generating the representation of the first view comprises rendering an image from text based metadata. The first view information includes the text based metadata.

In some embodiments, the text based metadata comprises code in a HyperText Markup Language (HTML), JavaScript Object Notation (JSON), or Extensible Markup Language (XML).

In some embodiments, generating the representation of the first view using the first view information comprises rendering the code into a web application on the remote user system.

In some embodiments, the method provides receiving first user input from the second user. The first user input corresponds to user input elements included in the first view. The method also provides generating input information representing the first user input and transferring the input information to the first user system.

In some embodiments, the first user system applies the first user input to the application based on the input information.

In some embodiments, the method provides receiving second view information from the user system. The second view information describes a second view presented to a first user of the user system such that the view can be represented at the remote user system. The method also provides generating a second representation of the second view using the second view information and displaying the second representation of the second view to the second user.

In yet another embodiment, a collaboration system is provided that includes one or more computer readable storage media and a processing system operatively coupled with the one or more computer readable storage media. The collaboration system further includes program instructions stored on the one or more computer readable storage media that, when read and executed by the processing system, direct the processing system to establish a collaboration communication between the user system and the remote user system. The program instructions further direct the processing system to receive first view information from the user system. The first view information describes a first view presented to a first user of the user system such that the view can be represented at the remote user system. The program instructions then direct the processing system to transfer the first view information to the remote user system that generates and displays a representation of the first view using the first view information.

In some embodiments, the program instructions further direct the processing system to select the remote user system from a plurality of remote user systems.

In some embodiments, the program instructions further direct the processing system to convert the first view information into code in a HyperText Markup Language (HTML) before transferring the first view information to the remote user system.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a communication environment for collaborating on the use of an application executing on a user system.

FIG. 2 illustrates an operation of the communication environment to collaborate on the use of an application executing on a user system.

FIG. 3 illustrates another operation of the communication environment to collaborate on the use of an application executing on a user system.

FIG. 4 illustrates yet another operation of the communication environment to collaborate on the use of an application executing on a user system.

DETAILED DESCRIPTION

Figure 5:
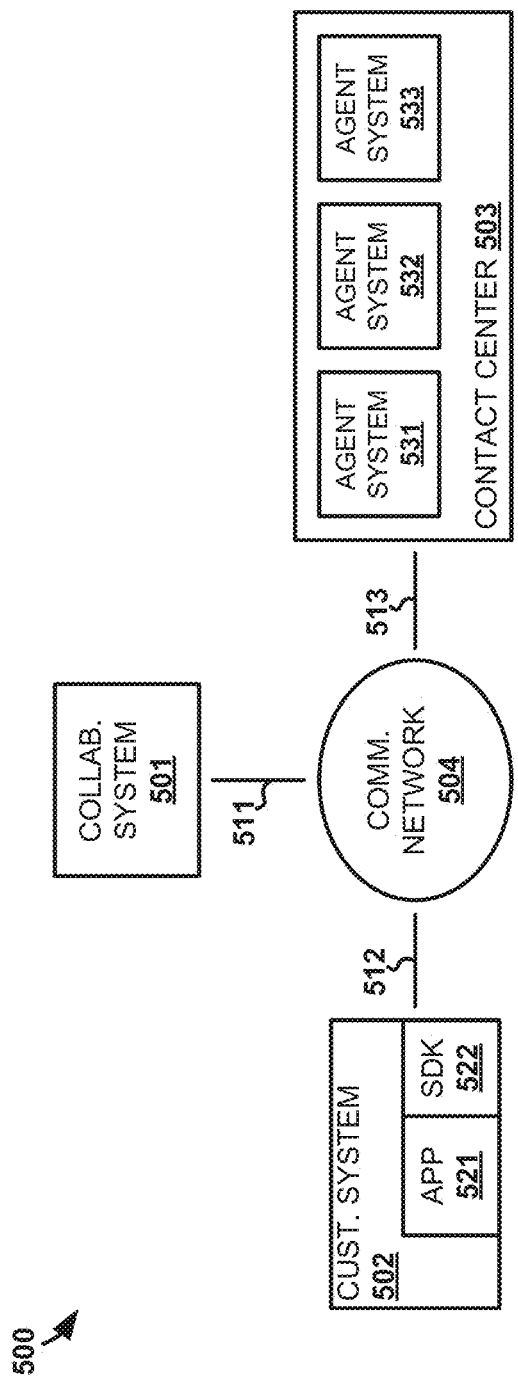
FIG. 5 illustrates another communication environment for collaborating on the use of an application executing on a user system.

Co-browsing is a way in which two web browsing applications on two respective computing systems can display the same website contemporaneously. Actions taken with the website on one computing system (e.g. user input such as data field entry, like selection, etc.) are reflected not only on that computing system but on the other computing system(s) in the co-browsing session. While website content is provided by a networked web server, which allows co-browsing systems to receive the same content and display the same view, much if not all of the content displayed by an application executing on a system is local to the system itself.

For example, a social media website may have both a website and an application. For a user system to display the website in a web browser, a web server(s) must provide all content for a view of the website to the user system, such as background graphics, icons, user posts, etc. However, an application for the social media website may only require the user post content from a server to display a view since the other graphics, icons, etc. are already included in the application itself. Therefore, displaying the same view on multiple systems for co-browsing like collaboration of such an application cannot be done in the same manner as a website.

FIG. 1 illustrates communication environment 100 for collaborating on the use of an application executing on a user system. Communication environment 100 includes collaboration system 101, user system 102, and user system 103. Application 121 is installed on user system 102. Collaboration system 101 and user system 102 communicate over communication link 111. Collaboration system 101 and user system 103 communicate over communication link 112.

In operation, collaboration system 101 facilitates collaboration on the use of application 121 when application 121 is executed on user system 102. As such, users of user system 102 and user system 103 can both view what is currently being displayed by application 121. This may allow the user of user system 102 to show the user of user system 103 something in application 121, may allow the user of user system 103 to help the user of user system 102 with application 121, or allow for some other purpose—including combinations thereof. In some cases, the user of user system 103 may be able to provide input into application 121 in addition to simply viewing what application 121 is displaying.

FIG. 2 illustrates operation 200 of communication environment 100 to collaborate on the use of an application executing on a user system. In operation 200, user system 102 determines a view presented to a user of user system 102 by application 121 (201). The view may be determined by instructing or requesting application 121 to indicate what is currently being displayed on user system 102 by application 121, by capturing a screen shot of application 121's view on user system 102, or in some other manner. User system 102 then generates view information that describes the view such that the view can be represented at a remote user system (202). The view information may differ depending on how the view was determined. For instance, the view information may include the screen shot described above or may include parameters for replicating the view, which may take the form of text based metadata, such as HyperText Markup Language (HTML), JavaScript Object Notation (JSON), Extensible Markup Language (XML), etc. In the latter example, the parameters may describe a location within application 121 currently being displayed, may describe user interface elements and/or graphics currently being displayed (e.g. which elements, element positions, etc.), or any other manner in which the view currently displayed by an application can be described.

User system 102 transfers the view information to the remote user system, user system 103 (203). Depending on how the collaboration is facilitated, the view information may be transferred directly to user system 103 (e.g. peer-to-peer) or may be transferred through collaboration system 101. Upon receipt of the view information, user system 103 is able to represent the view displayed by application 121 on user system 102 to a user of user system 103. Therefore, the user of user system 103 is able to know what is being displayed to the user of user system 102 despite both user system 102 and user system 103 not receiving the displayed content from a common source (e.g. a web server).

FIG. 3 illustrates operation 300 of communication environment 100 to collaborate on the use of an application executing on a user system. In operation 300, collaboration system 101 establishes a collaboration communication between user system 102 and user system 103 (301). The establishment of the collaboration communication may have been initiated from user system 102, user system 103, or from some other system. In some cases, user system 103 may be selected from multiple user systems, as may be the case when multiple users operating the multiple user systems are qualified to assist with the use of application 121. The collaboration communication is established such that users of user system 102 and user system 103 can collaborated on the use of application 121 during a collaboration session.

Collaboration system 101 receives the view information from user system 102 over the collaboration communication (302). As described above, the view information describes the view of application 121 such that the view can be represented at a remote user system, which is user system 103 in this embodiment. Collaboration system 101 then transfers the view information to user system 103 that generates and displays a representation of the first view using the view information (303). In some examples, the view information can be forwarded on to user system 103 in the same form in which it was received. However, in some examples, the view information needs to be reformatted or otherwise translated into view information that can be used by user system 103 before being transferred.

FIG. 4 illustrates operation 400 of communication environment 100 to collaborate on the use of an application executing on a user system. In operation 400, user system 103 receives the view information from user system 102 either directly or through collaboration system 101 depending on the communication arrangement between user system 102 and user system 103 (401). Again, the view information describes the view of application 121 such that the view can be represented user system 103 being a user system remote from user system 102.

Upon receiving the view information, user system 103 generates a representation of the view of application 121 using the view information (402). The representation may be in a "what you see is what you get" (WYSIWYG) format whereby a user of user system 103 is presented with the view of application 121 exactly as it is displayed on user system 102. A WYSIWYG representation may be generated from a screen shot included in the view information, from user system 103 executing its own version of application 121, either natively or in some sort of emulator or container, and then instructing that version of application 121 to generate the same view based on the view information, or may use some other means of generating the view representation—including combinations thereof. Once the view representation has been generated, user system 103 displays the representation of the view to a user of user system 103.

In some embodiments, as the view changes at user system 102, operation 200 repeats to send new view information describing the updated view to user system 103, either directly or through collaboration system 101 in accordance with steps 302 and 303 of operation 300. User system 103 then repeats operation 400 to display a representation of the updated view using the new view information. The view update may be caused by user input at user system 102 that provides data into a data field of application 121, that navigates to a different graphical area of application 121, that scrolls through a current graphical area of application 121, or any other reason for which the currently displayed view may change. In some examples, a user of user system 103 may also be allowed to provide input into the representation of the view via user system 103. An indication of that input is transferred to user system 102 on the collaboration communication and user system 102 applies the input into application 121, possibly after confirmation from a user of user system 102 confirming that the input from user system 103 is allowed.

Referring back to FIG. 1, collaboration system 101 comprises a computer processing system and communication interface. Collaboration system 101 may also include other components such as a router, server, data storage system, and power supply. Collaboration system 101 may reside in a single device or may be distributed across multiple devices. Collaboration system 101 may comprise a call routing equipment, a communication server, application server, personal computer workstation, network gateway system, or some other computing system—including combinations thereof.

User system 102 and user system 103 each comprise communication circuitry and processing circuitry. The communication circuitry may include wired communication components and/or wireless communication components, such as an amplifier, filter, modulator, and signal processing circuitry. User system 102 and user system 103 may also include a user interface, memory device, software, or some other communication components. User system 102 and user system 103 may be a telephone, tablet, watch, computer, gateway, e-book, mobile Internet appliance, network interface card, media player, game console, or some other communication apparatus—including combinations thereof.

Communication links 111 and 112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111 and 112 could be direct links or may include intermediate networks, systems, or devices.

FIG. 5 illustrates communication environment 500 for collaborating on the use of an application executing on a user system. Communication environment 500 includes collaboration system 501, customer user system 502, contact center 503, and communication network 504. Application 521 and software development kit (SDK) 522 are installed on customer user system 502. Contact center 503 includes agent user system 531, agent user system 532, and agent user system 533. Collaboration system 501 and communication network 504 communicate over communication link 511. Customer user system 502 and communication network 504 communicate over communication link 512. Contact center 503 and communication network 504 communicate over communication link 513.

Communication network 504 comprises network elements that provide communications services. Communication network 504 may comprise switches, wireless access nodes, Internet routers, network gateways, application servers, computer systems, communication links, or some other type of communication equipment—including combinations thereof. While illustrated as one network, communication network 504 may include multiple networks and network types, such as local area networks and the Internet.

In operation, customer user system 502 is one of many user systems that may install and run application 521. Application 521 was written to include SDK 522. As such, application 521 takes advantage of the application programming interface (API) allowed by SDK 522, which allows for the collaboration on the use of application 521 that is described herein. Thus, while shown as separate elements on customer user system 502, SDK 522 is incorporated into application 521. While this example only accounts for SDK 522's use in application 521, it should be understood that applications other than application 521 may incorporate SDK 522 in order to allow for collaboration on their use with user systems in contact center 503 or elsewhere.

In this example, contact center 503 staffs agents using agent user systems 531-533 to assist customers using application 521. Specifically, application 521 is provided by a business for customers to more easily access the goods and/or services offered by the business. Contact center 503 is operated by that business or is contracted by the business to assist those customers. Advantageously, through the use of SDK 522 and collaboration system 501, agents of contact center 503 can collaborate with customers using application 521. While shown outside of contact center 503, collaboration system 501 may be part of contact center 503. Likewise, agent user systems 531-533 may not be at the same location as contact center 503 may be a distributed contact center across multiple locations. Additionally, while collaboration system 501 is only discussed with regards to collaboration on application 521, collaboration system 501 system may also facilitate collaboration with other applications.

Figure 6:
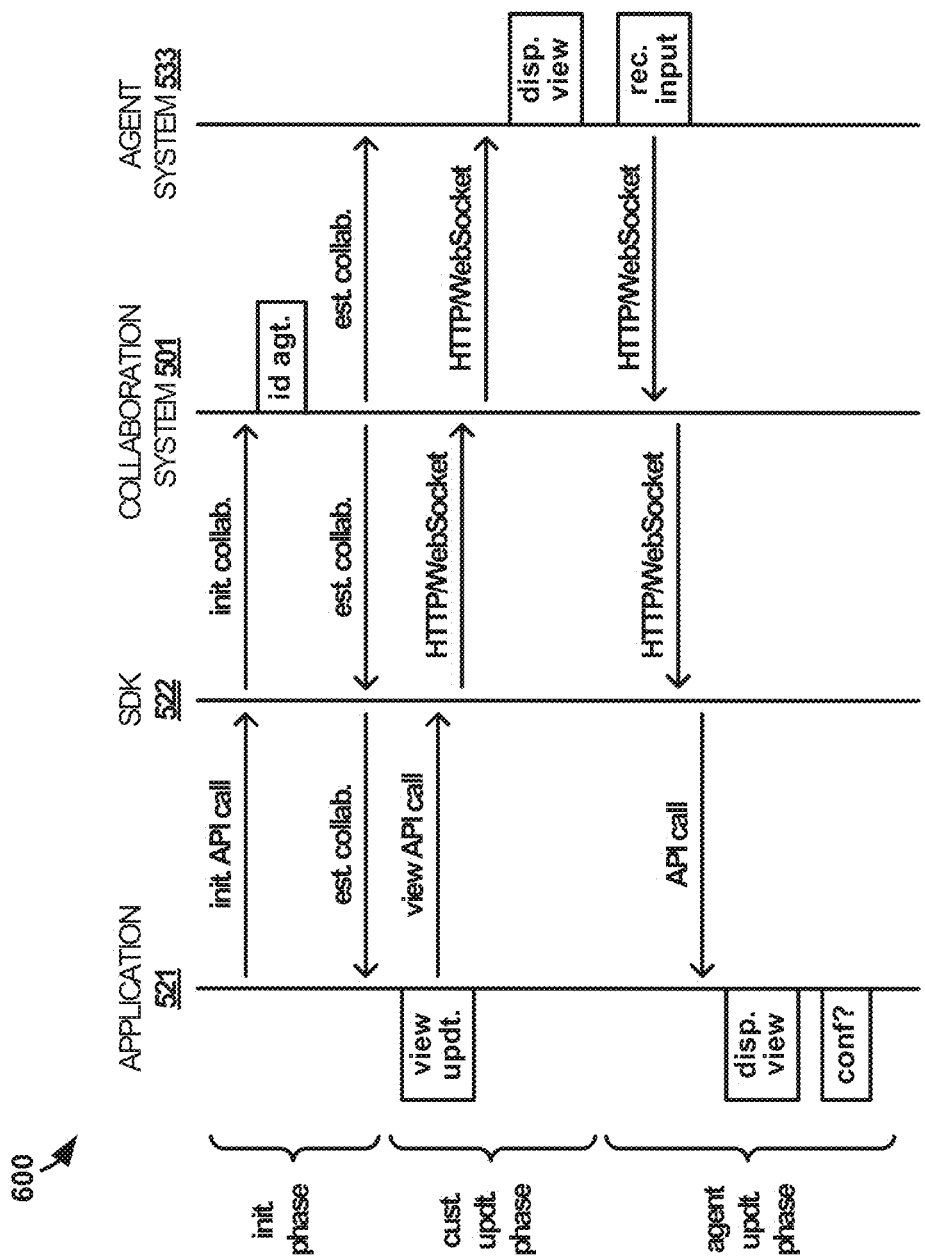
FIG. 6 illustrates an operation of the other communication environment to collaborate on the use of an application executing on a user system.

FIG. 6 illustrates operation 600 of communication environment 500 to collaborate on the use of an application executing on a user system. In the initial phase of operation 600, application 521 uses an API call of SDK 522 to initiate a collaboration session with an agent user system at contact center 503. When application 521 invokes the API call, SDK 522 instructs customer user system 502 to send a request over communication network 504 to collaboration system 501 to initiate the collaboration session. In one example, application 521 may provide a user selectable element on customer user system 502 that, upon selection by a user, triggers the initiation state of operation 600. It should be understood that, while the description below describes application 521 and SDK 522 performing certain actions, application 521 and SDK 522 in actuality are directing customer user system 502 to perform the actions, as is the nature of program instructions executing on a system.

Upon receiving the request from customer user system 502, collaboration system 501 identifies an agent user system at contact center 503. The agent user system may be selected based on agent availability, agent expertise, service level agreements, or on any other factor that could influence agent selection—including combinations thereof. Likewise, collaboration system 501 may use techniques similar to those used for current contact center call routing in order to select an agent user system. In this example, collaboration system 501 selects agent user system 533 and establishes a collaboration communication between customer user system 502 and agent user system 533 over which communications for the collaboration session travel. Additionally, the collaboration communication may further carry voice and/or video communications of users between customer user system 502 and agent user system 533. The addition of this feature allows users of customer user system 502 and agent user system 533 to speak to one another while collaborating on the use of application 521.

Once the initial phase of operation 600 has completed, a first run through of the customer update phase can be performed. During the customer update phase, application 521 is directing customer user system 502 to display a view of application 521. Application 521 uses a view update API call to SDK 522 indicating that the view should be updated from a previous view, which was nothing during this initial run through of the customer update phase. The API call may pass information describing the view or SDK 522 may determine the view for the purpose of generating view information in response to the view update API call. After receiving the view update API call, SDK 522 transfers information describing the view presented by application 521 to collaboration system 501. In this example, information exchanged with collaboration system 501 is transferred over Hypertext Transfer Protocol (HTTP) and WebSockets protocol, however other protocols may be used instead.

Upon receiving the view information, collaboration system 501 reformats or translates the view information, if necessary, before transferring the view information along to agent user system 533. For example, the view information may be reformatted into App-HyperText Markup Language (A-HTML), whereby the A-HTML code, when rendered, represents the view of application 521. While such a representation may not display the view exactly as it is presented by application 521, the representation should still provide all relevant view information to a viewing user (e.g. data entry fields, app navigation options, etc.). When agent user system 533 receives the view information from collaboration system 501, agent user system 533 displays the representation of the view. In one example, agent user system 533 executes an agent collaboration application that instructs agent user system 533 to receive and display the view representation as described herein.

It should be understood that when the view of application 521 updates, the customer update phase repeats so that agent user system 533 can display a representation of that update. In some cases, only certain view changes trigger updates. For instance, only changes certain fields or navigation actions may trigger updates so that resources are not used to transfer view updates that are not important to collaboration. For example, if application 521 includes a graphic, such as an advertisement, that will not likely be an issue during a collaboration session, then the customer update phase may not be triggered when that ad changes even though the view presented by application 521 changes.

Once at least a first view has been displayed to a user of agent user system 533, the agent update phase may be performed in response to user input at agent user system 533. The user input may include entry into a data field, selection of an option, selection of a navigation element, or any other type of input that an application running on a system can receive. In one example, the use of A-HTML to render the view representation allows for user interaction into the rendering in the same manner as any other A-HTML rendered application. However, other means of allowing input into the view representation displayed by agent user system 533 may also be used, such as agent user system 533 executing a copy of application 521 either natively or in a container or emulator and replicating the view using that copy.

Once the input is received by agent user system 533, a message to notify application 521 of the input is transferred by agent user system 533 to collaboration system 501. Upon receiving the message, collaboration system 501 translates the input into instructions that can be understood by SDK 522 if the input is not already in such a format. Collaboration system 501 then transfers the input to SDK 522, which uses another API call to apply the input to application 521. Application 521 updates its display to show a view with the input. Additionally, in this example, application 521 queries a user of customer user system 502 to confirm whether the user wants to accept the input from agent user system 533. If the user does not confirm, then the input is not applied (or reverted back from if already applied) to application 521. In some examples, the updated view caused by the input may trigger the customer update phase to repeat in order to display an updated view representation at agent user system 533. In other examples, agent user system 533 may infer the updated view based on the input and update the view representation accordingly without needing new view information from customer user system 502.

As with the customer update phase, the agent update phase may repeat multiple times during the collaboration session. In this case, the agent update phase is triggered when input is received into the view representation at agent user system 533.

Advantageously, an agent operating agent user system 533 can at least see a display of what application 521 is currently presenting to a customer user at customer user system 502. This allows the agent to more effectively discuss the use of application 521 with the customer without relying to the customer to describe what they are seeing in application 521. Additionally, the agent update phase, if implemented for the collaboration session, allows the agent to take action in application 521 on behalf of the user.

Figure 7:
FIG. 7 illustrates an application view in a scenario for collaborating on the use of an application executing on a user system.

FIG. 7 illustrates application view 700 in a scenario for collaborating on the use of an application executing on a user system. Application view 700 is a view that may be presented by application 521 in an example of operation 600. In this example, customer user system 502 is a smartphone and application 521 is an application for "Example Bank," which may be installed on customer user system 502 after being downloaded from an application store on customer user system 502. SDK 522 may be especially beneficial in the case of certain operating systems, many of which are designed for smartphones and tablets (or other mobile devices), whereby the sandboxing of applications and other operating system controls prevent collaboration functionality from being implemented external to an application.

The current view displayed in application view 700 is a mobile account creation section of application 521. Application view 700 includes a banner graphic identifying Example Bank, data entry fields to provide user information to set up a mobile account, buttons to submit information in the data entry fields, a menu button that displays options to navigate to other areas of application 521 when selected, and a selectable link to start a collaboration session with an agent. Application view 700 may take up the entirety of customer user system 502's display, as is common in smartphone applications, or may be contained within a window on customer user system 502. Upon a user selecting the agent assistance link, the initial phase of operation 600 is triggered.

Figure 8:
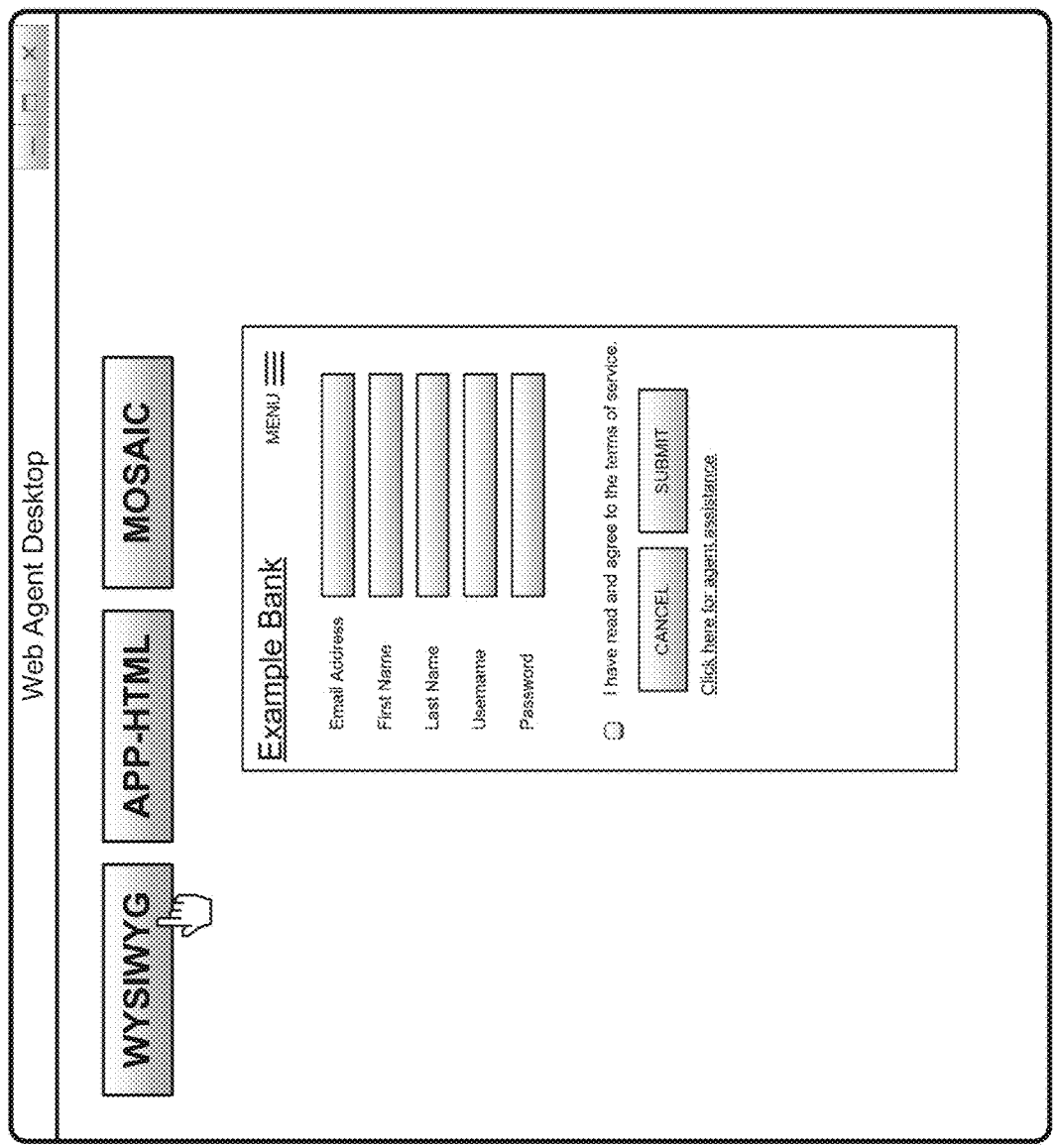
FIG. 8 illustrates a remote application view window in a scenario for collaborating on the use of an application executing on a user system.

FIG. 8 illustrates remote application view window 800 in a scenario for collaborating on the use of an application executing on a user system. Remote application view window 800 is a window of a web agent desktop application executing on agent user system 533 in an example of operation 600. Remote application view window 800 includes buttons that allow an agent to select a WYSIWYG view, an A-HTML view, or a mosaic view, which displays both the WYSIWYG view and the A-HTML view in remote application view window 800. An indication of the type of view selected may be transferred to collaboration system 501, which may in turn adjust the view information transferred to agent user system 533 to comply with the selected view type. Likewise, depending on the view type, collaboration system 501 may require different view information to be transferred by customer user system 502.

In this particular example, the agent has selected the WYSIWYG view. As such, remote application view window 800 displays an exact representation of what application view 700 displays. The representation may be scaled or may be the same size (either in pixels, centimeters, or some other measure of size) as what is displayed in application view 700. In one example, the WYSIWYG view may be achieved by the view information transferred from customer user system 502 including a screenshot of application 521, which would allow contact center 503 to simply display that screenshot. In an alternative example, the web agent desktop may emulate application 521 executing in remote application view window 800 and displays the emulated application 521 with the same view elements as application 521 on customer user system 502. In the latter example, the emulated application 521 may further allow for input from the agent via remote application view window 800.

Figure 9:
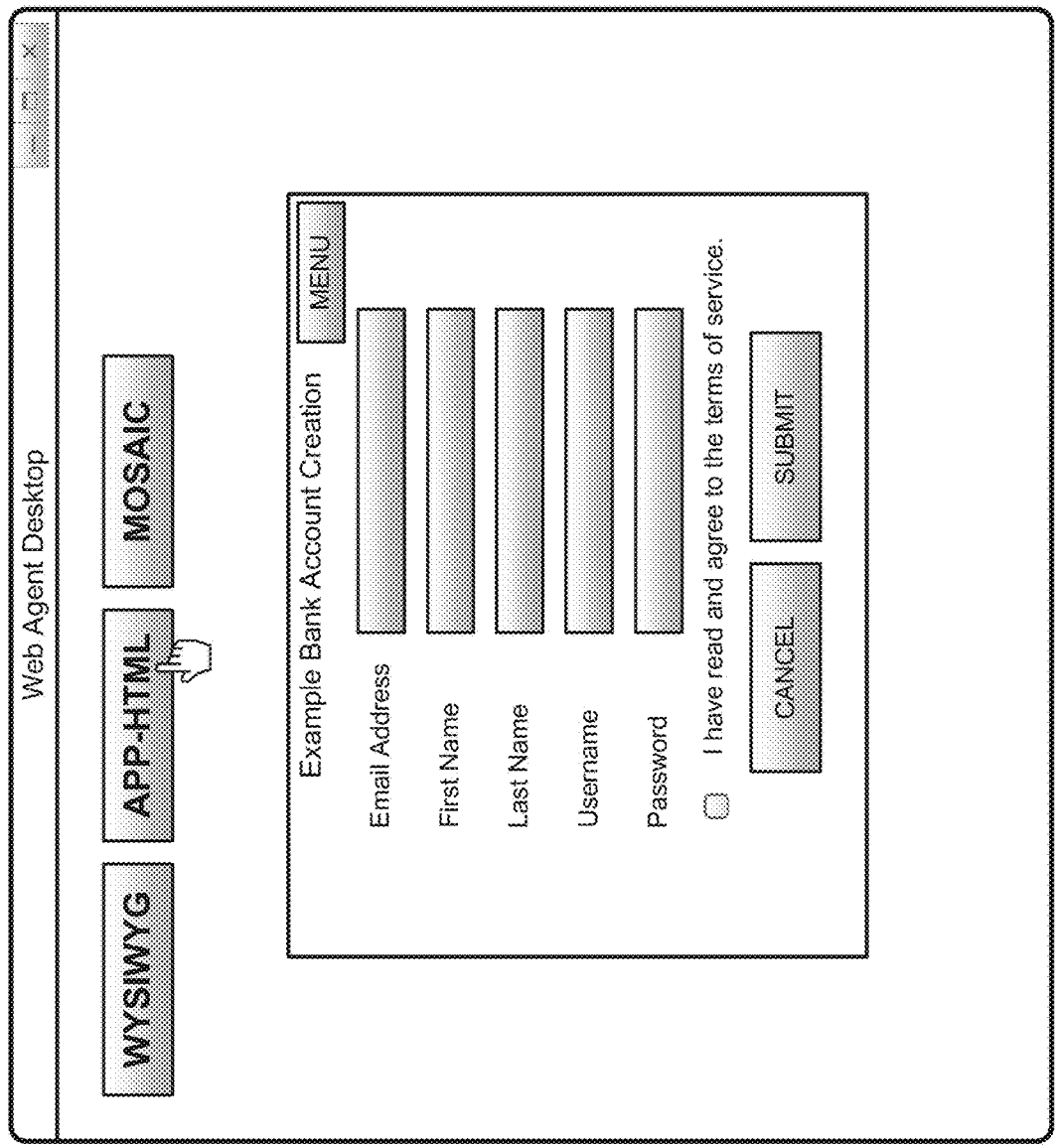
FIG. 9 illustrates another remote application view window in a scenario for collaborating on the use of an application executing on a user system.

FIG. 9 illustrates another remote application view window 900 in a scenario for collaborating on the use of an application executing on a user system. Remote application view window 900 is similar to remote application view window 800, although in remote application view window 900 the agent has selected the A-HTML view. Thus, rather than displaying application view 700 exactly as it is presented on customer user system 502 (although A-HTML may be able to closely replicate a WYSIWYG application view 700 in some examples), remote application view window 900 displays a rendering of A-HTML code provided as view information by collaboration system 501. The agent can then interact with the displayed fields in a manner similar to any other A-HTML application. For example, text entry into the "Email Address" field will be reflected in application view 700. Similarly, the agent's selection of the menu button in remote application view window 900 will trigger the selection of the menu icon in application view 700.

Figure 10:
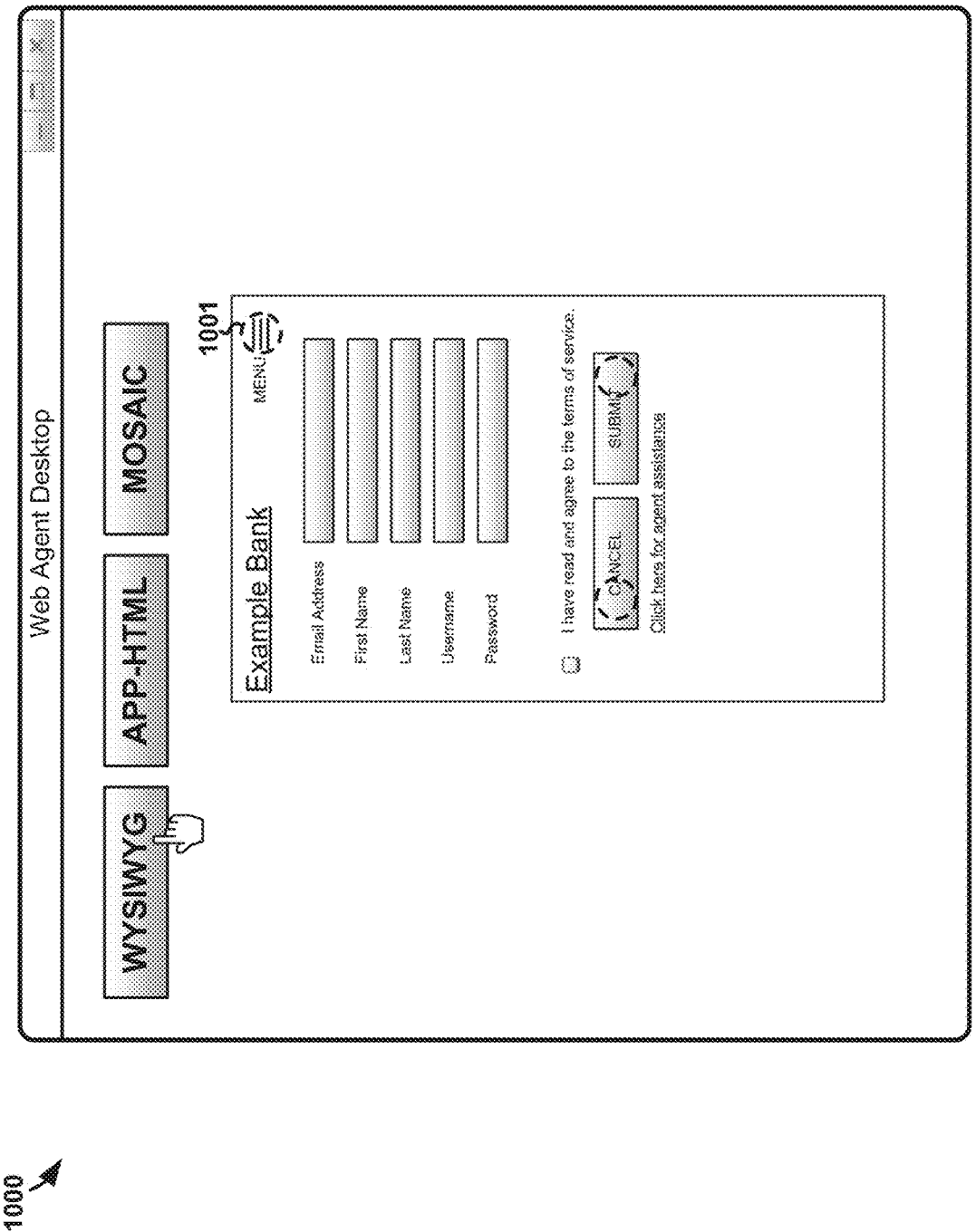
FIG. 10 illustrates yet another remote application view window in a scenario for collaborating on the use of an application executing on a user system.

FIG. 10 illustrates yet another remote application view window 1000 in a scenario for collaborating on the use of an application executing on a user system. Like remote application view window 800, remote application view window 1000 displays a WYSIWYG view of application view 700. Remote application view window 1000 also displays three touch points 1001. One over the menu button, one over the cancel button, and one over the submit button. Touch points 1001 indicate user interface items that the agent is allowed to interact with via remote application view window 1000. In some cases, each touch point may have additional limitations, such as conditions upon when the touch point can be activated. Additional limitations may be indicated by a touch point itself (e.g. color, shape, etc.), may be indicated in popup information when a touch point is hovered over, or may be indicated in some other way. Touch points 1001, and their corresponding limitations, may be default touch points for application 521 or may be set by a user of customer user system 502. Using graphical indications, like touch points 1001, over the view representation of application 521 provides guidance to the agent indicating how the agent can collaborate on the use of application 521.

Figure 11:
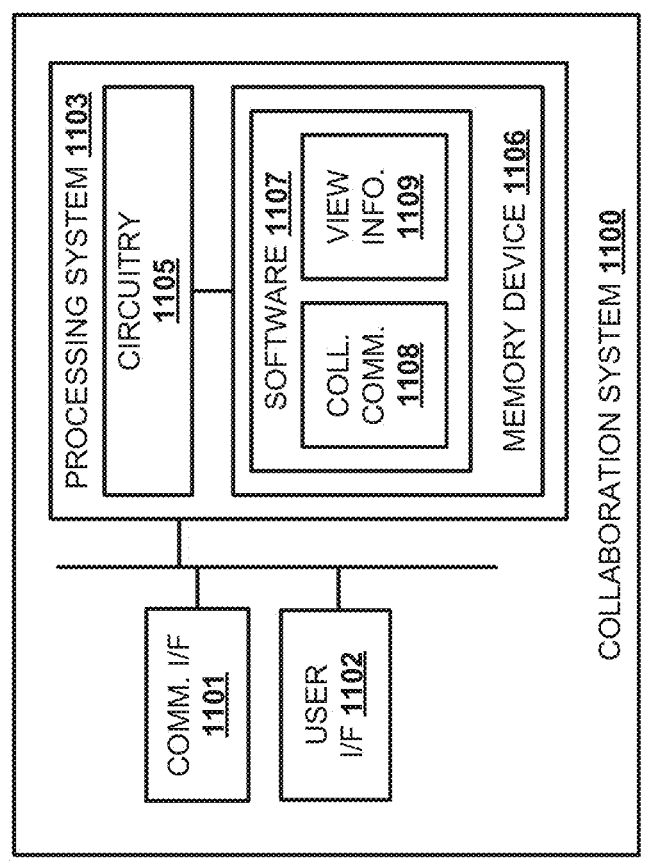
FIG. 11 illustrates a collaboration system for collaborating on the use of an application executing on a user system.

FIG. 11 illustrates collaboration system 1100. Collaboration system 1100 is an example of collaboration systems 101 and 502, although systems 101 and 501 may use alternative configurations. Collaboration system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format—including combinations thereof.

User interface 1102 comprises components that interact with a user. User interface 1102 may include a keyboard, display screen, mouse, touch pad, or some other user input/output apparatus. User interface 1102 may be omitted in some examples.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Operating software 1107 comprises computer programs, firmware, or some other form of machine-readable processing instructions. Operating software 1107 includes collaboration communication module 1108 and view information module 1109. Operating software 1107 may further include an operating system, utilities, drivers, network interfaces, applications, or some other type of software. When executed by circuitry 1105, operating software 1107 directs processing system 1103 to operate collaboration system 1100 as described herein.

In particular, collaboration communication module 1108 directs processing system 1103 to establish a collaboration communication between the user system and the remote user system. View information module 1109 directs processing system 1103 to receive first view information from the user system, wherein the first view information describes a first view presented to a first user of the user system such that the view can be represented at the remote user system, and to transfer the first view information to the remote user system that generates and displays a representation of the first view using the first view information.

Figure 12:
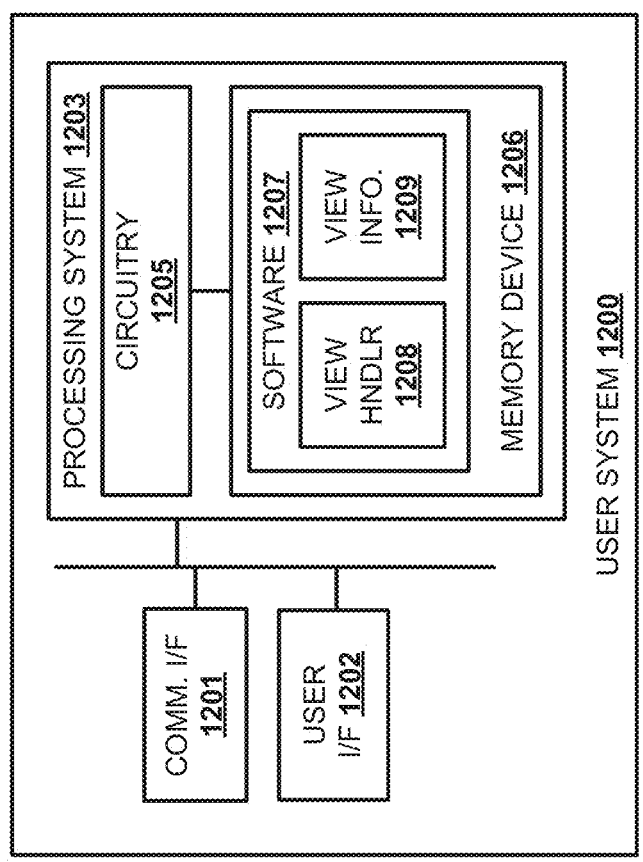
FIG. 12 illustrates a user system for collaborating on the use of an application executing on a user system.

FIG. 12 illustrates user system 1200. User system 1200 is an example of user systems 102, 103, 502, 531, 532, and 533, although those systems could use alternative configurations. User system 1200 comprises communication interface 1201, user interface 1202, and processing system 1203. Processing system 1203 is linked to communication interface 1201 and user interface 1202. Processing system 1203 includes processing circuitry 1205 and memory device 1206 that stores operating software 1207. User system 1200 may include other well-known components such as a battery and enclosure that are not shown for clarity. User system 1200 may be a telephone, computer, e-book, mobile Internet appliance, media player, game console, wireless network interface card, conference room system, or some other communication apparatus—including combinations thereof.

Communication interface 1201 comprises components that communicate over communication links, such as network cards, ports, RF transceivers, processing circuitry and software, or some other communication devices. Communication interface 1201 may be configured to communicate over metallic, wireless, or optical links. Communication interface 1201 may be configured to use TDM, IP, Ethernet, optical networking, wireless protocols, communication signaling, or some other communication format—including combinations thereof.

User interface 1202 comprises components that interact with a user to receive user inputs and to present media and/or information. User interface 1202 may include a speaker, microphone, buttons, lights, display screen, touch screen, touch pad, scroll wheel, communication port, or some other user input/output apparatus—including combinations thereof. User interface 1202 may be omitted in some examples.

Processing circuitry 1205 comprises microprocessor and other circuitry that retrieves and executes operating software 1207 from memory device 1206. Memory device 1206 comprises a non-transitory storage medium, such as a disk drive, flash drive, data storage circuitry, or some other memory apparatus. Processing circuitry 1205 is typically mounted on a circuit board that may also hold memory device 1206 and portions of communication interface 1201 and user interface 1202. Operating software 1207 comprises computer programs, firmware, or some other form of machine-readable processing instructions. Operating software 1207 includes view handler module 1208 and view information module 1209. Operating software 1207 may further include an operating system, utilities, drivers, network interfaces, applications, or some other type of software. When executed by processing circuitry 1205, operating software 1207 directs processing system 1203 to operate user system 1200 as described herein.

In the context of user systems like user system 102 and customer user system 502, view handler module 1208 directs processing system 1203 to determine a first view presented to a first user of user system 1200 by the application. View information module 1209 directs processing system 1203 to generate first view information that describes the view such that the view can be represented at a remote user system and transfer the first view information to the remote user system.

In the context of user system 103 and 531-533, view information module 1209 directs processing system 1203 to receive first view information from another user system, wherein the first view information describes a first view presented to a first user of that other user system such that the view can be represented at user system 1200. View handler module 1208 directs processing system 1203 to generate a representation of the first view using the first view information and display the representation of the first view to a second user of user system 1200.

It should be understood that, while the two examples above of user system 1200 both include modules 1208 and 1209 of the same name, the modules may be different depending on which example they are being applied to. Although, in some cases, the modules may be the same and include the instructions for implementing both examples.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a user system for collaborating on use of an application executing on the user system, the method comprising:

in the user system, receiving, via a user interface of the user system, user input from a first user of the user system directing the application to initiate a collaboration session between the user system and a remote user system that enables the first user and a user of the remote user system to collaborate on the use of the application;

in the user system, at the direction of instructions included in the application and in response to the user input:

determining a first view presented, by the user interface, to the first user by the application, wherein the first view includes one or more user input elements that are displayed by the application and configured to accept user input;

generating first view information that describes the first view such that the first view can be represented at the remote user system, wherein the first view information indicates that the application is displaying the one or more user input elements; and transferring the first view information to the remote user system over the collaboration session, wherein the remote user system presents a representation of the first view to a second user of the remote user system.

2. The method of claim 1, wherein a web application on the remote user system generates and displays a representation of the first view from the first view information.

3. The method of claim 1, wherein the first view information comprises a screenshot of the application as currently displayed on the user system.

4. The method of claim 1, wherein the first view information comprises text based metadata.

5. The method of claim 1, further comprising:

receiving input information representing first user input corresponding to the one or more user input elements; and applying the first user input to the application based on the input information.

6. The method of claim 1, further comprising:

after transferring the first view information, determining a second view presented to the first user of the user system by the application;

generating second view information that describes the second view such that the second view can be represented at the remote user system; and transferring the second view information to the remote user system.

7. The method of claim 1, wherein the application uses API calls of a Software Development Kit (SDK) for determining the first view, generating the first view information, and transferring the first view information and wherein an operating system into which the application is installed on the user system includes one or more controls that prevent determining the first view, generating the first view information, and transferring the first view information from being performed at the direction of instructions included in a second application installed into the operating system.

8. A method of operating a remote user system for collaborating on use of an application executing on a user system, the method comprising:

establishing a collaboration session between the remote user system and a user system, wherein a first user of the user system directed the application to initiate the collaboration session that enables the first user and a second user of the remote user system to collaborate on the use of the application;

receiving first view information from the user system over the collaboration session, wherein the first view information was generated and transferred by the user system at the direction of instructions included in the application, wherein the first view information describes a first view presented, by a user interface of the user system, to the first user by the application such that the first view can be represented at the remote user system, wherein the first view includes one or more user input elements that are displayed by the application and configured to accept user input, and wherein the first view information indicates that the application is displaying the one or more user input elements;

generating a representation of the first view using the first view information; and displaying the representation of the first view to the second user.

9. The method of claim 8, wherein an operating system into which the application is installed on the user system includes one or more controls that prevent generation and transfer of the first view information from being performed at the direction of instructions included in a second application installed into the operating system.

10. The method of claim 8, wherein generating the representation of the first view comprises:

rendering an image of a screenshot of the application as currently displayed on the user system, wherein the first view information includes the screenshot.

11. The method of claim 8, wherein generating the representation of the first view comprises:

rendering an image from text based metadata, wherein the first view information includes the text based metadata.

12. The method of claim 11, wherein the text based metadata comprises code in a HyperText Markup Language (HTML), JavaScript Object Notation (JSON), or Extensible Markup Language (XML).

13. The method of claim 12, wherein generating the representation of the first view using the first view information comprises:

rendering the code into a web application on the remote user system.

14. The method of claim 8, further comprising:

receiving first user input from the second user, wherein the first user input corresponds to the one or more user input elements;

generating input information representing the first user input; and transferring the input information to the user system.

15. The method of claim 14, wherein the user system applies the first user input to the application based on the input information.

16. The method of claim 8, further comprising:

receiving second view information from the user system, wherein the second view information describes a second view presented to the first user of the user system such that the second view can be represented at the remote user system;

generating a second representation of the second view using the second view information; and displaying the second representation of the second view to the second user.

17. A collaboration system for collaborating on use of an application executing on a user system, the collaboration system comprising:

one or more computer readable storage media;

a processing system operatively coupled with the one or more computer readable storage media; and program instructions stored on the one or more computer readable storage media that, when read and executed by the processing system, direct the processing system to:

establish a collaboration session between a user system and a remote user system, wherein a first user of the user system directed the application to initiate the collaboration session that enables the first user and a second user of the remote user system to collaborate on the use of the application;

receive first view information from the user system over the collaboration session, wherein the first view information was generated and transferred by the user system at the direction of instructions included in the application, wherein the first view information describes a first view, by a user interface of the user system, to the first user by the application such that the first view can be represented at the remote user system, wherein the first view includes one or more user input elements that are displayed by the application and configured to accept user input, and wherein the first view information indicates that the application is displaying the one or more user input elements; and transfer the first view information to the remote user system that generates and displays a representation of the first view to the second user using the first view information.

18. The collaboration system of claim 17, wherein the program instructions further direct the processing system to:

select the remote user system from a plurality of remote user systems.

19. The collaboration system of claim 17, wherein the program instructions further direct the processing system to:

convert the first view information into code in a HyperText Markup Language (HTML) before transferring the first view information to the remote user system.

20. The collaboration system of claim 17, wherein an operating system into which the application is installed on the user system includes one or more controls that prevent generation and transfer of the first view information from being performed at the direction of instructions included in a second application installed into the operating system.

* * * * *